March 6, 1951 — P. H. PALEN ET AL — 2,544,542
TRANSMISSION
Filed Sept. 7, 1945 — 4 Sheets-Sheet 1

INVENTORS
HARRY W. BURDETT.
PETER H. PALEN.
ATTORNEY

March 6, 1951  P. H. PALEN ET AL  2,544,542
TRANSMISSION
Filed Sept. 7, 1945  4 Sheets-Sheet 2

INVENTORS
HARRY W. BURDETT.
PETER H. PALEN.
BY
ATTORNEY

March 6, 1951

P. H. PALEN ET AL 2,544,542

TRANSMISSION

Filed Sept. 7, 1945

INVENTORS
HARRY W. BURDETT.
PETER H. PALEN.
BY
ATTORNEY

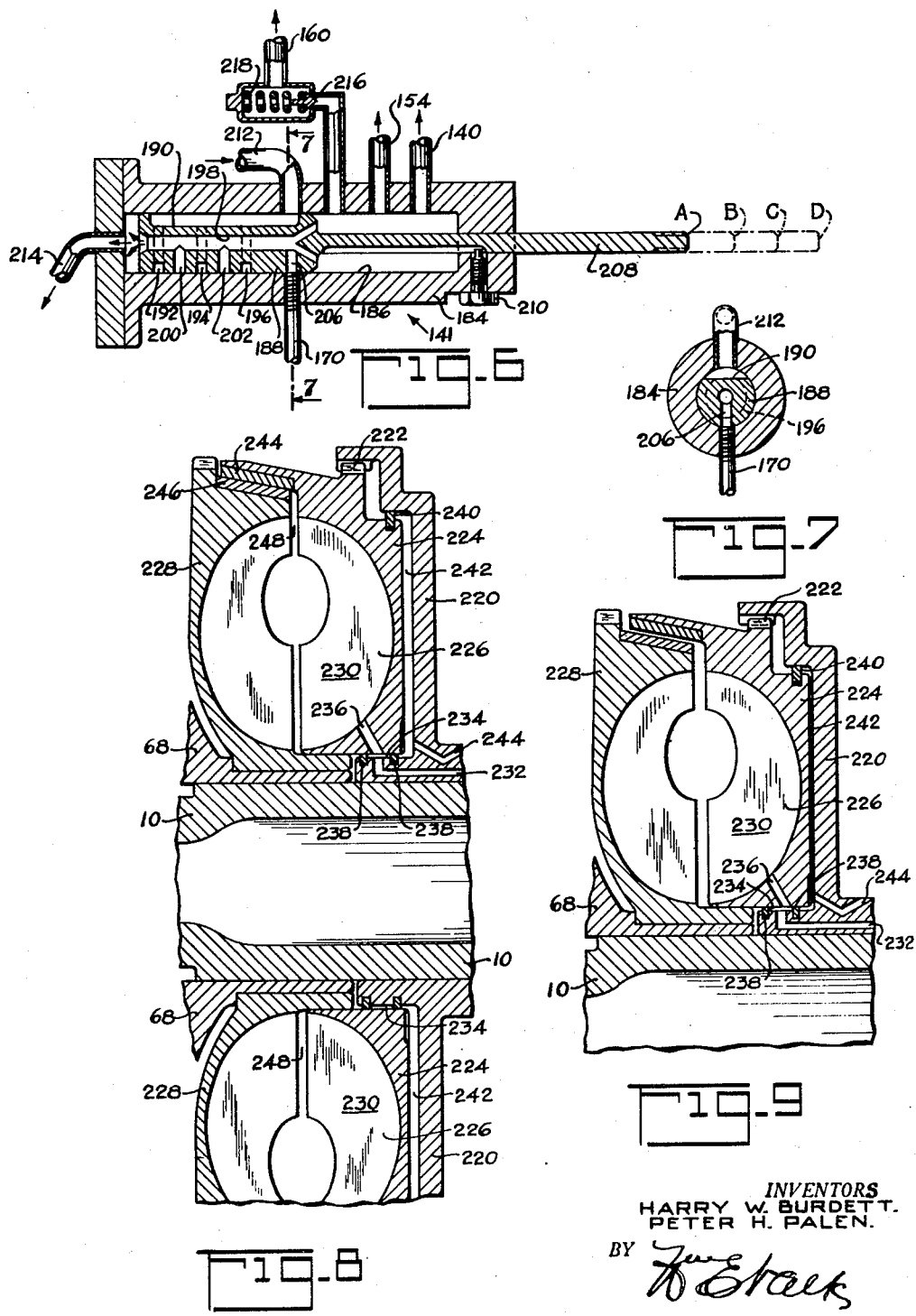

Patented Mar. 6, 1951

2,544,542

UNITED STATES PATENT OFFICE 2,544,542

TRANSMISSION

Peter H. Palen, Paterson, and Harry W. Burdett, Glen Rock, N. J., assignors to Wright Aeronautical Corporation, a corporation of New York Application September 7, 1945, Serial No. 614,850

4 Claims. (Cl. 74—688)

This invention relates to multi-speed transmissions and is particularly directed to a transmission affording four speed ratios. The invention is described in connection with a multi-speed drive from an engine to a supercharger therefor. However, the invention is not limited to this specific application but instead is of general utility.

It is an object of this invention to provide a novel four-speed transmission in which the load is divided between two parallel paths in all but one of the speed ratios. The transmission includes two friction brakes and a hydraulic coupling and the arrangement is such that two of the speed ratios are effected with both friction brakes disengaged by emptying and filling the hydraulic coupling. The other two speed ratios are effected with the coupling full by engaging one or the other of the friction clutches.

With the present invention, wear and scuffing of the friction brakes is minimized because the brakes are arranged to engage substantially without shock and under only small loads. To this end, the hydraulic coupling not only acts as a shock absorber during engagement and disengagement of the friction brakes, but the hydraulic coupling also is controlled to unload the drive including the friction brakes prior to their engagement or disengagement. In addition, the hydraulic coupling acts to dampen torsional vibrations while at least a portion of the load is being transmitted through the coupling.

It is a further object of this invention to provide a novel means for controlling the slip of the hydraulic coupling. Specifically, the vaned hydraulic coupling elements are adapted to be moved axially relative to each other to control the slip of the coupling. In addition, it is an object of this invention to provide novel means for frictionally locking the coupling elements together when the coupling elements are in position for minimum slip.

Other objects of this invention will become apparent upon reading the annexed detailed description in connection with the drawing in which:

Figure 1 is an axial sectional view through a transmission embodying the invention;

Figures 2, 3, 4 and 5 are sectional views taken along lines 2—2, 3—3, 4—4 and 5—5 of Figure 1;

Figure 6 is a sectional view of a fluid pressure control valve for use with the transmission of Figure 1;

Figure 7 is a sectional view taken along line 7—7 of Figure 6; and

Figures 8 and 9 are axial sectional views of a modified form of hydraulic coupling.

Figure 1:
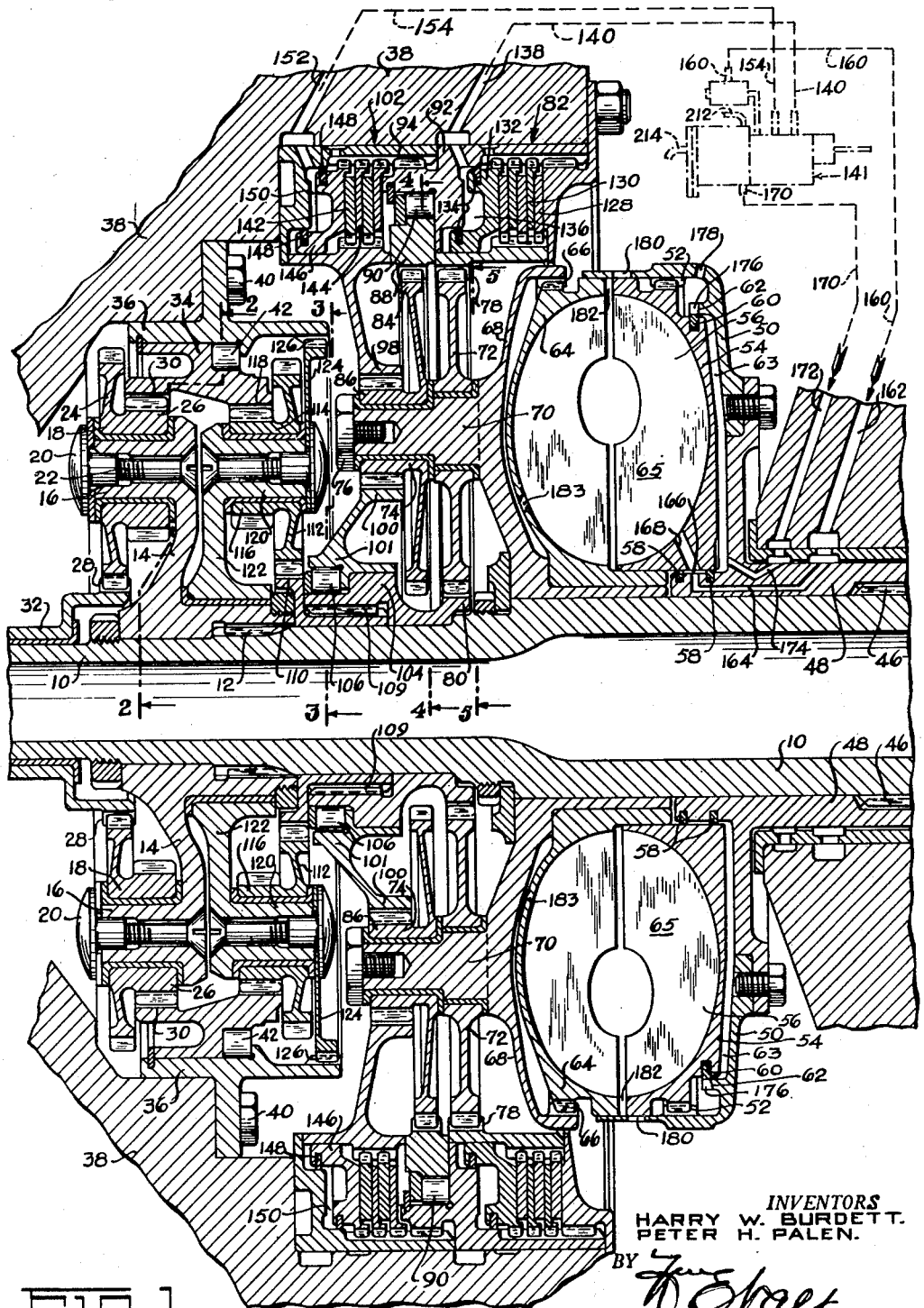

Referring to the drawing, particularly to Figures 1 to 5, a shaft 10 comprising an extension of the engine crankshaft, is provided with splines 12 to which a planet pinion carrier 14 is drivably connected. The planet pinion carrier has a plurality of studs 16 projecting therefrom and about which double planet pinions 18 are journaled, said pinions being held on the studs by nut heads 20 secured to bolts 22 passing through the studs 16. Each double planet pinion 18 comprises a pair of integrally formed pinions 24 and 26 disposed in meshing engagement with annular gears 28 and 30 respectively. The gear 28 is formed on the output shaft 32 which is adapted to drive a supercharger (not shown) while the gear 30 acts as a torque reaction member for the drive through the double planet pinions 18. Reaction gear 30 has a rim portion 34 piloted on a drum 36 secured to the fixed housing structure 38 by bolts 40. One-way or over-running brake rollers 42 are disposed between the reaction gear rim 34 and the drum 36. The reaction gear rim 34 is provided with a plurality of conventional one-way brake cam surfaces 44 providing wedge-shaped spaces within which the rollers 42 are disposed.

Figure 2:
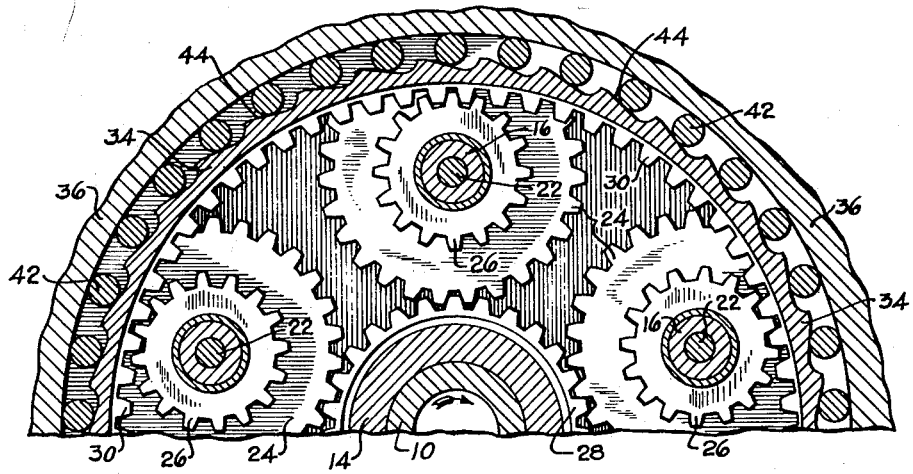

With the shaft 10 rotating clockwise, as viewed in Figure 2, the reaction gear 30 also tends to rotate clockwise and the orientation of the cam surfaces 44 is such that clockwise rotation of the reaction gear 30 is prevented by wedging of the rollers 42 between the cam surfaces 44 and the drum 36.

The aforedescribed planetary gear train provides a step-up speed ratio from the input or engine shaft 10 to the supercharger or output shaft 32. A further step-up in the speed ratio may be effected by rotation of the reaction gear 30 counterclockwise, as viewed in Figure 2, that is, in a direction opposite to the reaction torque acting thereon as a result of the drive through the double planet pinions 18. With this construction, it is possible to provide a plurality of different speed drive ratios between the input shaft 10 and the output shaft 32.

In order to provide a drive to the reaction gear 30 from the shaft 10, the shaft 10 is extended and splined at 46 to the hub 48 of an annular member 50. The member 50 is provided with internal splines 52 drivably connected to a conventional vaned driving element 54 of a hydraulic coupling 56. A pair of spaced seal rings 58 are disposed between the hub of the element 54 and the hub member 48. A seal ring 60 is disposed between the coupling runner or element 54 and an internal annular flange 62 adjacent the outer periphery of the annular member 50 thereby providing a sealed annular chamber 63 for the purpose hereinafter described.

With the hydraulic coupling full, rotation of the vaned coupling driving element 54 drives a complementary vaned coupling element 64 through the hydraulic liquid within the working chamber 65 disposed between the coupling elements 54 and 64. The driven coupling element 64 is splined at 66 to a planet carrier member 68 having a plurality of studs 70 projecting therefrom. A simple planet pinion 72 and a compound or double planet pinion 74 are journaled about each stud 70 and are held thereon by machine screws 76.

Figure 4:
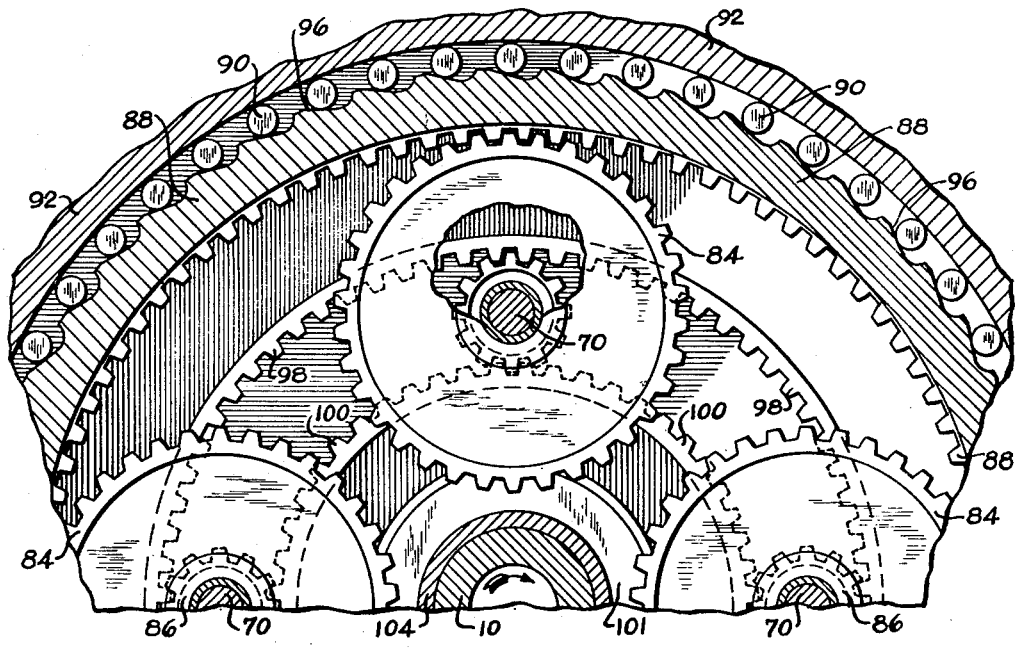
Figure 5:
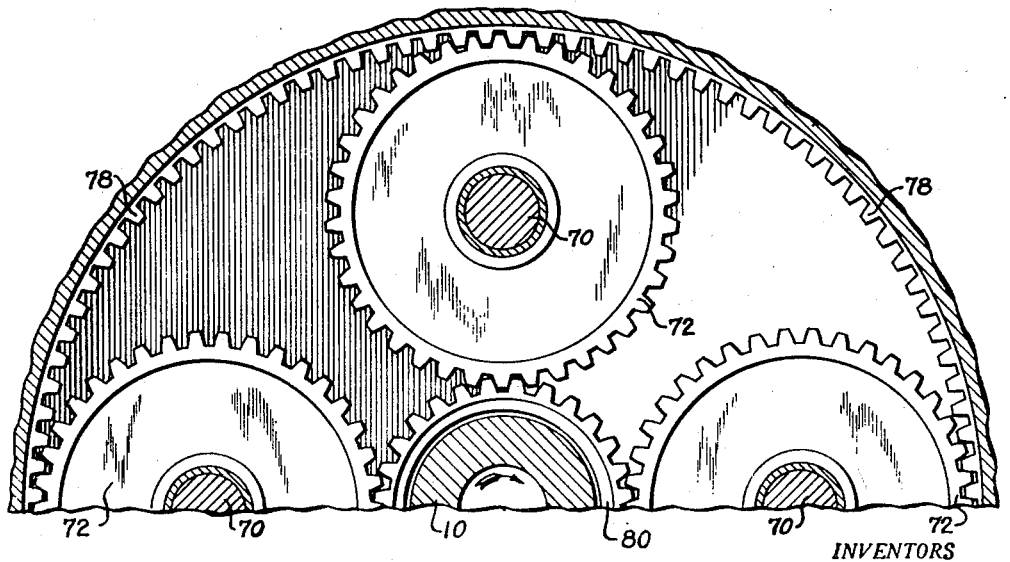

The planet pinions 72 are disposed between and in meshing engagement with concentric annular gears 78 and 80. The gear 78 is adapted to be frictionally held against rotation by engagement of a brake 82. The double planet pinions 74 each comprise integrally formed pinion gears 84 and 86 of which the gears 84 engage an outer annular gear 88. The rim of the gear 88 also forms the cam member of a one-way or over-running brake comprising rollers 90 and a drum member 92 splined to the member 94 which, in turn, is fixedly secured to the housing 38. As illustrated in Figure 4, the rim of the annular gear 88 is provided with cam surfaces 96 so oriented that, with clockwise rotation of the planet carrier 68, clockwise rotation of the gear 88 is prevented but the gear 88 is free to rotate in a counterclockwise direction.

Figure 3:
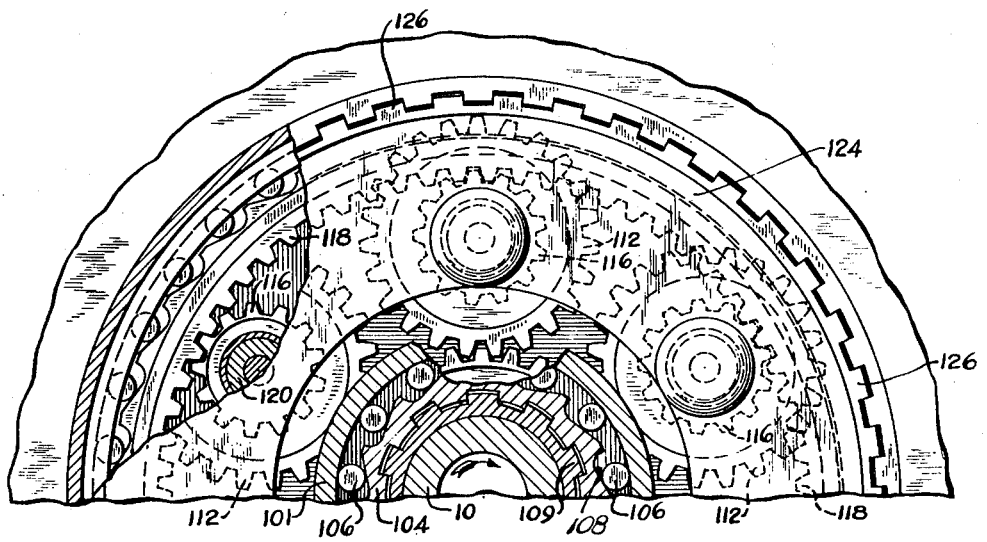

The gear 86 of each double planet pinion 74 is disposed between the outer annular gear 98 and the inner annular gear 100. The outer annular gear 98 is adapted to be frictionally held against rotation upon engagement of a brake 102. The hub 101 of the inner annular gear 100 is connected to the hub 104 of the gear 80 through a one-way or over-running clutch comprising rollers 106 and cam surfaces 108 on the hub 104. The orientation of the cam surfaces 108 is such that, as illustrated in Figure 3, the one-way clutch 106 permits the gear 80 to overrun the gear 74.

The hub 104 of the gear 80 is splined at 109 to the annular gear 110 which, in turn, meshes with gears 112 of a plurality of double pinion gears 114. The other gear 116 of each of the double pinion gears 114 is disposed in meshing engagement with a second gear 118 formed on the rim 34 of the reaction gear 30. The double pinions 114 are journaled about fixed studs 120 formed on an annular member 122 which, in turn, is piloted about the hub of the planet carrier 14. The member 122 is held against rotation by a plate 124 secured thereto and splined at 126 to the fixed drum 36. With this construction, the gear 110 is adapted to drive the gear 118 and consequently the reaction gear 30 in a direction opposite to the reaction torque acting on the gear 30 from the pinions 26. That is the gear 30 is driven in a counterclockwise direction (as viewed in Figure 2), this direction being opposite to the direction of rotation of the gear 110.

As illustrated, the brake 82 comprises a plurality of alternate frictionally engageable plates 128 and 130 respectively splined to the rim of the gear 78 and to the annular member 92 secured to the housing 38. A piston 132 is provided with seal rings 134 cooperating with the member 92 to provide a sealed annular chamber 136 relative to which the piston 132 is slidable. The arrangement is such that, when fluid under pressure is supplied to the chamber 136 through a passage 138 and conduit 140 from a valve 141 hereinafter described, the plates 128 and 130 are frictionally clamped together to lock the gear 78 against rotation.

The brake 102 may be similar to the aforedescribed brake 82 and, as illustrated, comprises a plurality of alternate frictionally engageable plates 142 and 144 respectively splined to the rim of the gear 98 and to the annular member 94 secured to the housing 38. A piston 146 is provided with seal rings 148 cooperating with the member 94 to provide a sealed annular chamber 150 relative to which the piston 146 is slidable. Fluid under pressure is adapted to be supplied to the chamber 150 through a passage 152 and conduit 154 under the control of the valve 141 to frictionally clamp together the plates 142 and 144 thereby locking the gear 98 against rotation.

In brief, the input shaft 10 is drivably connected to the output shaft 32 through the planet pinion carrier 14, the gear 30 providing the reaction torque for power transmitted through said carrier. In addition, the input shaft 10 is drivably connected to the reaction gear 30 for driving said gear in a direction opposite to said reaction torque. The last-mentioned driving connection includes the hydraulic coupling 56 and a variable speed ratio gear set connected in series with said coupling between the input shaft 10 and said gear 30. This variable speed ratio gear set comprises the pinions 72, 74 and 114, the gears meshing with said pinions and the associated clutches and brakes.

With the aforedescribed construction, first or low speed is provided with the hydraulic coupling 56 unloaded. In this condition of the transmission, power is transmitted from the input shaft 10 through the planet pinion carrier 14 and its double planet pinions 18 to the output shaft 32, thereby providing a step-up speed drive ratio from the input shaft 10 to the output shaft 32. The roller brake 42 prevents rotation of the reaction gear 30 in the direction of the reaction torque acting upon the gear 30—that is clockwise as viewed in Figure 2—with a clockwise rotation of the shaft 10. Also, since the hydraulic coupling 56 is empty in first speed, no power is transmitted through any of the other gears of the transmission and therefore the reaction gear 30 remains stationary in first speed.

In second, third and fourth speeds, power is transmitted from the input shaft 10 to the output shaft 32 through the planet pinion carrier 14 and its double planet pinions 18, as in first speed. In addition, power is transmitted through the hydraulic coupling 56 to drive the reaction gear 30 counterclockwise as viewed in Figure 2. That is, the gear 30 is driven in a direction opposite to the direction of the reaction torque acting thereon resulting from the power transmitted through the planet carrier 14, thereby providing a step-up in the speed drive ratio above the first speed ratio by an amount depending on the speed at which the reaction gear 30 is thus driven.

In the second speed, the hydraulic coupling 56 is filled and both friction brakes 82 and 102 are disengaged. The reaction gear 30 is then driven from the shaft 10 through the hydraulic coupling 56, planet carrier 68, double planet pinions 74, one-way clutch 106, gear 110 and double pinions 114 to the reaction gear 30. In this second speed, the reaction torque necessary for driving the gear 30 is provided by the roller brake 90 which prevents rotation of the annular gear 88. In third speed, the hydraulic coupling remains full or loaded and the friction brake 102 is engaged to provide the reaction torque for driving the gear 30. The gear 30 is driven from the input shaft 10 through the hydraulic coupling 56, planet carrier 68, planet pinion gears 86, annular gear 100, one-way clutch 106, gear 110 and the double pinions 114. In this condition of the transmission, the roller brake 90 merely over-runs because pinion gears 86 are smaller than their integrally formed pinion gears 84.

In fourth speed, the hydraulic coupling also remains loaded and both friction brakes 82 and 102 are engaged. In this speed ratio, the reaction gear 30 is driven from the input shaft 10 through the hydraulic coupling 56, planet carrier 68, planet pinion gears 72, gears 80 and 110 and the double pinion gears 114. In this condition of transmission, the brake 82 provides the necessary reaction torque to drive the gear 30 while the roller brake 90 and roller clutch 106 over-run. Friction brake 102 preferably remains engaged in fourth speed, but this brake has no operating effect in fourth speed since the gear 80 is driven at a speed greater than that of the gear 100 so the clutch 106 over-runs.

If desired, the friction brake 102 could be disengaged in fourth speed, in which case the one-way clutch 106 would not be necessary. Also it should be obvious that other conventional types of clutches and brakes could be substituted for various clutches and/or brakes illustrated.

Summarizing, in first speed the hydraulic coupling is unloaded and both friction brakes 82 and 102 are disengaged. In second speed, the hydraulic coupling is loaded and both friction brakes are still disengaged. In third speed, the hydraulic coupling is loaded and the friction brake 102 is engaged. In fourth speed, both friction brakes are engaged and the hydraulic coupling is loaded, although in this speed, only friction brake 82 has any operating effect. When the speed of the output shaft is reduced to any lower ratio, the above sequence is merely reversed.

As hereinafter described the hydraulic coupling 56 is unloaded between second, third and fourth speeds. However there is no power off interval during shifts between these speeds because the planet carrier 14 continuously transmits power.

The hydraulic coupling 56 comprises the conventional vaned coupling elements 54 and 64 between which the working liquid of the coupling is adapted to be disposed in the chamber 65. Liquid is supplied to the coupling working chamber 65 from the valve 141 through conduit 160, passages 162 and 164, annular space 166 and passage 168, the ends of the annular space 166 being closed by the seal rings 58. Fluid under pressure is also adapted to be supplied from the valve 141 through conduit 170, passages 172 and 174, to the sealed annular chamber 63. Upon the supply of fluid pressure to the chamber 63, the hydraulic coupling element 54 is moved axially toward its complementary element 64 against the pressure of the working fluid within the coupling chamber 65. That is, the coupling element 54 moves to the position illustrated in Figure 1 to reduce the clearance between the coupling elements 54 and 64. The seal ring 60 is adapted to partially uncover one or more slots 176 in the flange 62 after the coupling element 54 has thus moved to the left to a predetermined position close to the other coupling element 64.

The arrangement is such that when fluid under pressure is supplied to the coupling chamber 63, the coupling element 54 moves toward its complementary element 64 until the fluid pressure leakage through the slots 176 and thence through the openings 178 in the rim of the member 50 is such magnitude that the pressure within the chamber 63 balances the opposing pressure of the fluid within the hydraulic coupling chamber 65. The one or more slots 176 are so-disposed that, when the pressure on opposite sides of the coupling element 54 is balanced, there is only a small clearance between the coupling elements 54 and 64 whereby the coupling operates with a minimum of slip. When the fluid pressure to the coupling chamber 63 is cut off, the coupling elements 54 and 64 separate, whereupon the slip between these elements greatly increases thereby at least partially unloading the coupling.

In order to further increase coupling slip when the fluid pressure is cut off from the chamber 63, the rim of the annular member 50 is provided with one or more slots 180. The slots 180 are disposed so that, when pressure is applied to the chamber 63 and the coupling elements have moved close together as illustrated in Figure 1, the rim of the member 50 substantially seals the annular clearance 182 between the outer periphery of the coupling elements 54 and 64. But, when the chamber 63 is cut off from the source of fluid pressure, the coupling elements 54 and 64 separate and uncover the slots 180. Leakage of the coupling liquid from the chamber 65 through the slots 180 increases the slip of the coupling and also helps to remove the heat produced within the coupling because of this slippage. The coupling is also provided with a drain opening or openings 183 adjacent its hub to provide a continual but small circulation of fluid through the coupling working chamber 65.

The supply of fluid pressure to the hydraulic coupling 56 is coordinated by the valve 141 with the supply of fluid pressure to the friction brakes 82 and 192 in such a manner that the pressure supplied to the coupling chamber 63 is cut off before engagement or disengagement of the brakes 82 or 102. In this way, the drive to the reaction gear 30 is relieved of load prior to engagement or disengagement of the brakes 82 and 102 thereby minimizing the wear caused by slippage between their friction plates.

Figure 6 illustrates a suitable valve 141 for controling the supply of fluid pressure to the coupling 56 and to the friction brakes 82 and 102. As illustrated, the valve comprises a body portion 184 having a bore 186 for the reception of plug-type valve member 188. The valve member 188 has a flat 190 formed on one side and terminating short of the ends of this member. In addition, three equally spaced annular grooves 192, 194 and 196 are disposed about the valve member and a central passage 198 communicates with the bore 186 at the opposed ends of this member. In addition, a pair of radial holes 200 and 202 extend from the bore 198 to the surface of the valve member 188 opposite the flat 190. The radial holes 200 and 202 respectively are disposed midway between the annular grooves 192 and 194 and the annular grooves 194 and 196. A third radial hole 206 extends outwardly from the pasage 198 and is spaced from the annular groove 196 by an amount equal to the spacing of the annular grooves about the valve member.

The valve member 188 is designed to be moved to any one of four positions—one for each speed ratio of the transmission—by an arm 208 extending therefrom. A set screw 210 is adapted to prevent rotation of the valve member 188. As illustrated in Figure 6, the valve member 188 is in its first speed position and, as indicated in this figure, it may be moved to the right to its second, third and fourth speed positions. The first, second, third and fourth speed-ratio positions of the arm 208 are indicated on Figure 6 by the reference letters A, B, C and D respectively, the space between adjacent speed-ratio positions being equal to the space between adjacent grooves 192, 194 and 196.

Liquid under pressure—for example, engine lubricating oil—is supplied to a conduit 212 which extends through the valve body 184 and opens into the flat 190 on the valve member 188. In addition, a conduit 214, connected to a suitable drain, extends through the valve body and opens into the bore 186 therein. Accordingly, since the valve member passage 198 extends between the ends of the valve member, the opposed ends of the valve bore 186 are connected to the drain conduit 214. The conduits 140, 154, 160 and 170 also open into the bore 186 of the valve body at a spacing corresponding to the spacing of the valve member 188 between its various speed ratio positions. In addition, conduits 140, 154 and 160 are disposed in a common plane with the flat 190 and the conduit 212 and the conduit 170 is disposed in a common plane with the passages 200 and 202.

A pressure-reducing valve 216, urged in a closing direction by a spring 218, is disposed in the conduit 160. When liquid is supplied through the conduit 160 to the working chamber 65 of the hydraulic coupling, there is a continual small circulation of liquid through the coupling as provided by the openings 183 so that the valve 216 is effective to reduce the pressure of the liquid supplied to the coupling chamber 65.

The construction of the valve 141 is such that, in the first speed position, the working chamber 65 and the pressure chamber 63 of the hydraulic coupling and both friction brakes 82 and 102 are vented or drained to the conduit 214. Accordingly, in first speed, there is no drive to the reaction gear 30 through the hydraulic coupling 56 and the entire drive of the output shaft 32 is through the double planet pinions 18. In the second speed position of the valve member 188, the annular groove 196 is alined with the conduit 170 and the conduit 212 is in communication with the conduit 160 through the flat 190. Accordingly, liquid under pressure is now supplied to the working chamber 65 of the coupling through conduit 160 and to the coupling pressure chamber 63 through the conduit 170. However, conduits 140 and 154 are still connected to the drain passage 214 so that both friction brakes remain disengaged. Accordingly, in second speed the hydraulic coupling 56 is loaded but both friction brakes are unloaded or disengaged.

As the valve member 188 is moved to its third speed position, the drain passage 202 is momentarily alined with the conduit 170 thereby venting or draining the coupling pressure chamber 63 whereby the coupling elements 54 and 64 separate and the hydraulic coupling operates with a high degree of slip. That is, the hydraulic coupling is at least partially unloaded to unload the drive to the reaction gear 30. Upon completion of this shift to third speed, the source of fluid pressure in the conduit 212 is connected to the conduit 154 via the flat 190 to effect engagement of the brake 102. At the same time, the annular groove 194 is alined with the conduit 170 to restore the pressure in the coupling pressure chamber 63 thereby reloading the coupling and restoring the drive to the reaction gear 30. The reloading of the coupling 56 takes longer than the engagement of the brake 102 so that, upon shift to third speed from second speed, the friction brake 102 is engaged while the hydraulic coupling is momentarily at least partially unloaded by the separation of the coupling elements 54 and 64. That is, the friction brake 102 is engaged under substantially no load.

During the shift to third speed, as well as during the shift to fourth speed, liquid is continually supplied to the coupling working chamber 65 via the flat 190 and conduit 160. It should also be noted that, when the pressure to chamber 63 is cut off and the coupling elements 54 and 64 separate, the coupling drain port 180 is opened and the resulting flow of liquid therethrough from the coupling chamber 65 is effective to remove the heat generated by the coupling slip.

As the valve member 188 is moved to its fourth speed position, the drain passage 200 is momentarily alined with the conduit 170 thereby venting or draining the coupling pressure chamber 63 just as in the shift from second speed to third speed. As a result, the coupling 56 is momentarily at least partially unloaded and upon completion of the shift to fourth speed, the flat 190 establishes communication between the source of pressure in conduit 212 and the conduit 140 to effect engagement of the friction brake 82. At the same time, the annular groove 192 is alined with the conduit 170 to restore the pressure in the coupling chamber 63 and again load the coupling and restore the drive to the reaction gear 30. It should also be noted that in the shift from third to fourth speed, the conduit 154 remains connected to the source of fluid pressure in the conduit 212. Accordingly, friction brake 102 remains engaged in fourth speed but, as previously noted, this has no operating effect.

When the valve member 188 is moved in a down shift direction, this above sequence is reversed and the friction brakes 82 and 102 are at least partially unloaded prior to their disengagement by cutting off the pressure to the coupling chamber 63 to at least partially unload the coupling.

With the aforedescribed construction, the friction brakes 82 and 102 are engaged and disengaged while under substantially no load thereby minimizing wear and scuffing of their brake plates. In addition, these brakes operate under a relatively small load because they only control the drive from the input shaft 10 through the reaction gear 30 to the output shaft 32, which drive, in effect is in parallel with the drive through the planet pinion carrier 14 to the output shaft 32. Because of this parallel drive arrangement, the hydraulic coupling also does not carry the full load.

The conventional hydraulic coupling, when full of liquid, operates with a small amount of slip. Figures 8 and 9 illustrate a modification in which the coupling elements are frictionally engaged to to prevent any slip of the coupling.

In Figures 8 and 9, an annular drive member 220 is splined at 222 to a vaned element 224 of a hydraulic coupling 226 and a complementary vaned element 228 is adapted to be driven thereby. The working chamber 230 of the hydraulic coupling between the coupling elements 226 and 228 is supplied with liquid through a passage 232, annulus 234 and the passage 236, the ends of the annulus 234 being closed by seal rings 238. A seal ring 240 is disposed between the coupling element 224 and the annular drive member 220 adjacent the outer periphery of these members and the seal ring 240 together with one of the seal rings 238 defines a sealed annular chamber 242. The chamber 242 is supplied with a liquid or fluid pressure through a passage 244.

The vaned coupling elements 224 and 228 are provided with facing conical frictionally engageable annular members 244 and 246 adjacent their outer periphery thereby providing a friction cone clutch. When the chamber 242 is subjected to a suitable pressure, the coupling element 224 moves toward the coupling element 228 until the cone clutch members 244 and 246 engage as illustrated in Figure 8. The supply of liquid to the coupling chambers 230 and 242 may be similar to that illustrated in Figure 1 in connection with the hydraulic coupling 56.

With this construction, when the pressure is cut off from the chamber 242, the liquid pressure within the coupling chamber 230 causes the coupling element 224 to move away from the coupling element 228 as illustrated in Figure 9, whereupon the coupling operates with a maximum of slip. Upon the application of pressure to the coupling chamber 242, the coupling element 224 moves toward the coupling element 228 thereby reducing slip of the coupling. The cone clutch members 244 and 246 are disposed to engage just as the coupling elements 224 and 228 approach a position of minimum slip. In this way, the cone clutch members are brought to very little relative slip prior to their engagement. In addition, prior to engagement of the cone clutch members 244 and 246, there is continuous leakage of liquid radially outwardly through the clearance 248 between the vaned coupling elements 224 and 228. This escaping liquid flows over the surfaces of the cone clutch members 244 and 246 thereby helping to remove the heat produced by their relative slippage as these members engage. Engagement of the cone clutch members 244 and 246 is effective to shut off this flow of the coupling liquid radially outwardly through the annular clearance 248.

In Figures 8 and 9, there is no drain opening at the outer periphery of the coupling chamber 242 corresponding to drain opening or slots 176 of Figure 1, since in Figures 8 and 9 engagement of the cone clutch members 244 and 246 limits movement of the coupling elements 224 and 228 toward each other. Also the friction engaging surfaces 244 and 246, instead of being conical, obviously could be flat.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A multi-speed transmission comprising an input shaft; an output shaft; means providing a driving connection between said shafts; said means including a member subjected to reaction torque resulting from the transmission of torque by said means from said input shaft to said output shaft; means operable to prevent rotation of said reaction member at least in the direction of said reaction torque to provide a speed ratio drive from said input shaft to said output shaft; means operable to drivably connect said input shaft to said reaction member for driving said member from said input shaft in a direction opposite to said reaction torque at any one of a plurality of speed ratios thereby providing additional speed ratio drives between said shafts; said last named means including a hydraulic coupling and a variable speed ratio gear set connected between said input shaft and said torque reaction member; and means for changing the speed ratio of said gear set and for controlling said hydraulic coupling so as to at least partially unload said coupling during a speed ratio change of said gear set.

2. A multi-speed transmission comprising an input shaft; an output shaft; means providing a driving connection between said shafts; said means including a member subjected to reaction torque resulting from the transmission of torque by said means from said input shaft to said output shaft; means operable to prevent rotation of said reaction member at least in the direction of said reaction torque to provide a speed ratio drive from said input shaft to said output shaft; means operable to drivably connect said input shaft to said reaction member for driving said reaction member from said input shaft in a direction opposite to said reaction torque at any one of a plurality of speed ratios thereby providing additional speed ratio drives between said shafts; said last named means including a hydraulic coupling and a variable speed ratio gear set serially connected between said input shaft and said torque reaction member; and means for at least partially unloading said hydraulic coupling when changing the speed ratio of said gear set.

3. A multi-speed transmission comprising an input shaft; an output shaft; means providing a driving connection between said shafts; said means including a member subjected to reaction torque resulting from the transmission of torque by said means from said input shaft to said output shaft; means operable to prevent rotation of said reaction member at least in the direction of said reaction torque to provide a speed ratio drive from said input shaft to said output shaft; means operable to drivably connect said input shaft to said reaction member for driving said reaction member from said input shaft in a direction opposite to said reaction torque at any one of a plurality of speed ratios thereby providing additional speed ratio drives between said shafts; said last named means including a hydraulic coupling and a variable speed ratio gear set serially connected between said input shaft and said torque reaction member; and means for changing the speed ratio of said gear set and for at least partially unloading said hydraulic coupling during a speed ratio change of said gear set.

4. A multi-speed transmission comprising an input shaft; an output shaft; a planetary gear train providing a driving connection between said shafts; said planetary gear train including a member subjected to the reaction torque resulting from the transmission of torque by said gear train from said input shaft to said output shaft; means operable to prevent rotation of said reaction member at least in the direction of said reaction torque to provide a speed ratio drive from said input shaft to said output shaft; means operable to drivably connect said input shaft to said reaction member for driving said reaction torque at any one of a plurality of speed ratios thereby providing additional speed ratio drives between said shafts; said last named means including a hydraulic coupling and a variable speed ratio gear set serially connected between said input shaft and said torque reaction member; and means for changing the speed ratio of said gear set and for at least partially unloading said hydraulic coupling during a speed ratio change of said gear set.

PETER H. PALEN.
HARRY W. BURDETT.

REFERENCES CITED

The following references are of record in the file of this patent:

UNITED STATES PATENTS

| Number | Name | Date |
|---|---|---|
| 1,962,972 | Stock | June 12, 1934 |
| 1,977,553 | Hafford | Oct. 16, 1934 |
| 2,004,279 | Fottinger | June 11, 1935 |
| 2,014,944 | Martyrer | Sept. 17, 1935 |
| 2,021,526 | Stock | Nov. 19, 1935 |
| 2,024,842 | Bauer | Dec. 17, 1935 |
| 2,143,312 | Griswold | Jan. 10, 1939 |
| 2,147,528 | Fottinger | Feb. 14, 1939 |
| 2,203,546 | Pollard | June 4, 1940 |
| 2,290,319 | Dodge | July 21, 1942 |
| 2,323,592 | Gunberg | July 6, 1943 |
| 2,361,105 | Jandasek | Oct. 24, 1944 |
| 2,368,865 | Murray | Feb. 6, 1945 |
| 2,400,536 | Chilton | May 21, 1946 |